US011985731B2

(12) United States Patent
Huang et al.

(10) Patent No.: US 11,985,731 B2
(45) Date of Patent: May 14, 2024

(54) SYSTEMS AND METHODS FOR EXPOSING USER EQUIPMENT IDENTITY

(71) Applicant: Verizon Patent and Licensing Inc., Basking Ridge, NJ (US)

(72) Inventors: Ye Huang, San Ramon, CA (US); Jason Logan Anderson, Plano, TX (US); Om Prakash, Acton, MA (US); Michael R. Waters, Staten Island, NY (US); Shannon A. Donaghey, Flower Mound, TX (US); Carlos A Cazanas, Bethlehem, PA (US); Brendan Major, Randolph, NJ (US); Miguel A Carames, Long Valley, NJ (US); Alexander Fadeev, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 17/038,443

(22) Filed: Sep. 30, 2020

(65) Prior Publication Data

US 2022/0104004 A1 Mar. 31, 2022

(51) Int. Cl.
*H04W 8/20* (2009.01)
*H04W 8/26* (2009.01)
*H04W 48/16* (2009.01)
*H04W 88/16* (2009.01)
*H04L 101/654* (2022.01)

(52) U.S. Cl.
CPC ............ *H04W 8/205* (2013.01); *H04W 8/26* (2013.01); *H04W 48/16* (2013.01); *H04W 88/16* (2013.01); *H04L 2101/654* (2022.05)

(58) Field of Classification Search
None
See application file for complete search history.

(56) References Cited

U.S. PATENT DOCUMENTS

| | | | | |
|---|---|---|---|---|
| 8,774,381 B1* | 7/2014 | Keeling | ............... | H04M 3/4365 379/201.11 |
| 2012/0302229 A1* | 11/2012 | Ronneke | ............... | H04L 61/106 455/422.1 |
| 2018/0324578 A1* | 11/2018 | Zhu | ........................ | H04W 76/20 |
| 2019/0166016 A1* | 5/2019 | Livanos | ................ | H04W 76/10 |
| 2020/0383086 A1* | 12/2020 | Ianev | ..................... | H04W 68/02 |
| 2021/0058518 A1* | 2/2021 | Thakur | ................ | H04W 48/16 |
| 2021/0067967 A1* | 3/2021 | Arzelier | ............. | H04W 12/069 |
| 2022/0022029 A1* | 1/2022 | Di Girolamo | .......... | H04W 4/50 |

* cited by examiner

*Primary Examiner* — German Viana Di Prisco

(57) ABSTRACT

A device, located in a core network associated with a radio access network (RAN), may include a processor configured to expose services or capabilities to application servers outside the core network, wherein the device is located in a core network associated with a radio access network (RAN). The processor may be further configured to receive a subscriber identifier message from a gateway device that established a connection to a user equipment (UE) device via the RAN, wherein the subscriber identifier message includes information identifying the UE device; receive a request from an application server associated with the connection for the information identifying the UE device; and provide the requested information identifying the UE device to the application server, in response to receiving the request from the application server.

20 Claims, 10 Drawing Sheets

SYSTEMS AND METHODS FOR EXPOSING USER EQUIPMENT IDENTITY

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. The communications network may need to provide different types of services to a large number of diverse devices under various types of conditions. Managing a large number of different services under different conditions poses various challenges.

DETAILED DESCRIPTION OF PREFERRED EMBODIMENTS

Figure 1:
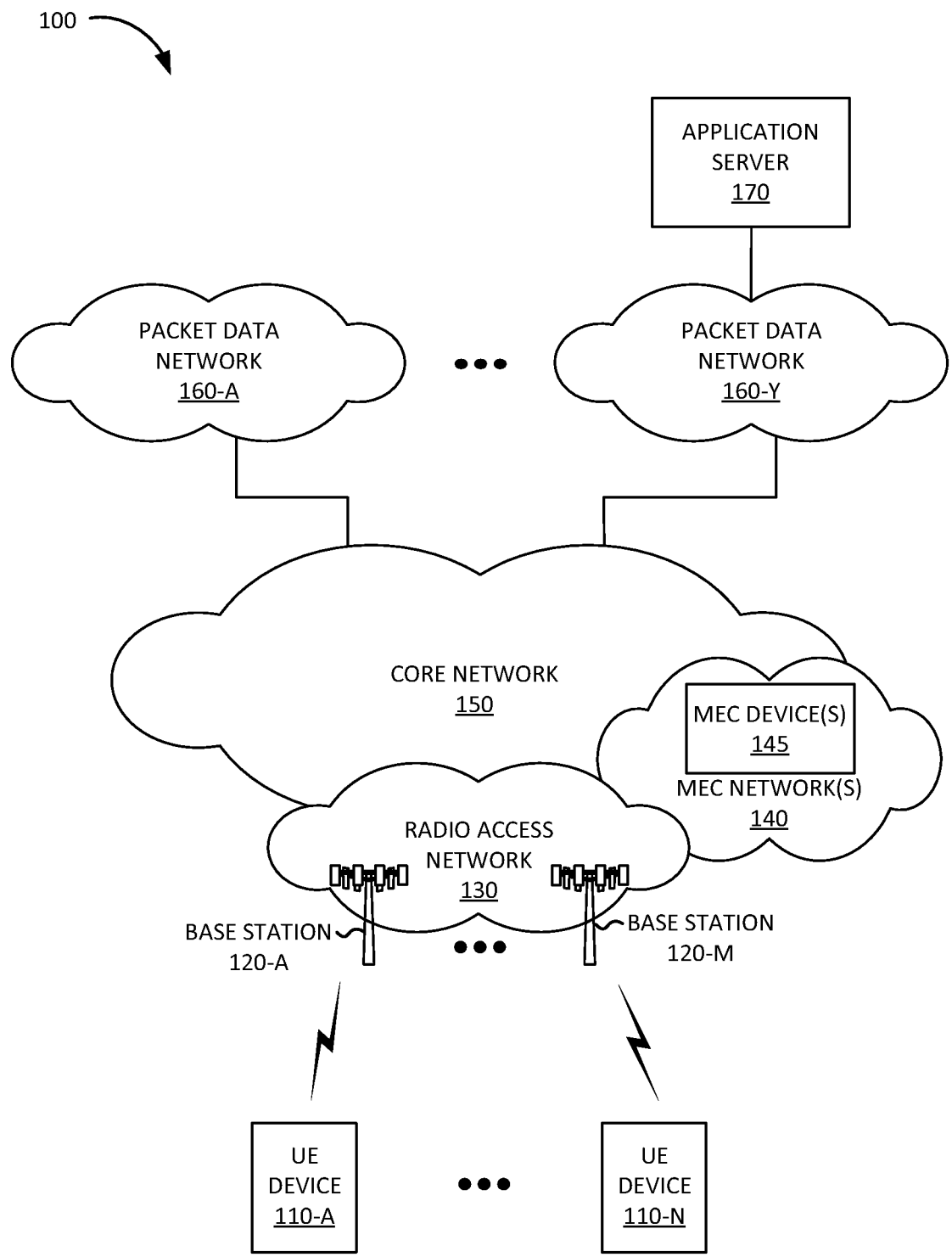
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable wireless communication devices (e.g., smart phones, etc.), referred to as user equipment (UE) devices, to connect to networks and obtain services via the provider's core network, such as a Fourth Generation (4G) core network and/or a Fifth Generation (5G) core network. For example, a UE device may connect to a third-party application server via a browser application or another type of application installed on the UE device. The application server may, for example, stream video or audio to the UE device, may provide real-time gaming, host a web site, provide a peer-to-peer messaging service, and/or perform another type of service for UE devices.

The connection from the UE device to the application server may be based on an Internet Protocol (IP) connection and the application server may identify a connection associated with a UE device based on an IP address assigned to the UE device by the provider's core network. However, the IP address assigned to a UE device may change relatively frequently or may be translated (e.g., using Network Address Translation (NAT), etc.) and, therefore, may not be reliable for identifying a UE device. That is, the application server may not be able to determine an identity associated with a UE device based on the IP address from the traffic flow that the application received or detected for the UE device (e.g., because of the NAT performed on the traffic flow for IP version 4 (IPv4)). Therefore, the application server may not be able to determine an identity of a UE device associated with a connection. In addition, even if the application server obtains an IP version 6 (IPv6) address assigned to the UE device by the carrier network, the application server may not be able to determine the UE device identity, because the binding of the UE device identity and the IP address assigned to the UE device are stored in the carrier network and not accessible to the application server.

Implementations described herein relate to systems and methods for exposure of UE identity in 4G and 5G networks. A gateway device may set up a connection for a UE device and may assign an IP address to the UE device. The gateway device may correspond to a 4G gateway device, such as a Packet Data Network Gateway (PGW), a 5G gateway device, such as a User Plane Function (UPF), and/or another type of gateway device. In response to setting up a connection for the UE device, the gateway device may send a subscriber identifier (ID) message to an exposure function device that is configured to communicate with a server device outside the core network. For example, the exposure function device may be configured to expose services or capabilities to application servers outside the core network. The exposure function device may correspond to a 4G exposure function device, such as a Service Capability Exposure Function (SCEF), a 5G exposure function device, such as a Network Exposure Function (NEF), and/or another type of network exposure device. For example, in some implementations, a core network may include a network exposure device configured to function as both a 4G SCEF and a 5G NEF.

The subscriber ID message sent by the gateway device to the network exposure device may include a Mobile Station International Subscriber Directory Number (MSISDN) associated with the UE device, an International Mobile Subscriber Identity (IMSI) associated with the UE device, an IP address allocated to the UE device by the gateway device, a port allocated to the UE device by the gateway device (e.g., for situations in which an IPv4 address is assigned to the UE device), a Radio Access Technology (RAT) type associated with the UE device, and/or other information associated with the UE device. Furthermore, the subscriber ID message may include information identifying a trigger event for causing the gateway device to send the subscriber ID message. The trigger event may include, for example, the UE device attaching to the core network via the RAN, the UE device detaching from the core network, an IP address and/or port being allocated to the UE device, an IP address and/or port being deallocated for the UE device, and/or another type of trigger event used by the gateway device to determine to send a subscriber ID message.

The network exposure device may receive the subscriber ID message from the gateway device and may store information included in the subscriber ID message in a UE binding connections database (DB). The network exposure device may provide an Application Programming Interface (API) that may be used by application servers to request identifying information associated with UE devices. The network exposure device may receive a request, from an application server and via the API, for information identifying the UE device. The request may include a UE device IP address and/or port associated with the UE device, as detected by the application server for the IP traffic flow associate with the UE device. The network exposure device may identify a connection associated with the UE device based on the IP address and/or port included in the request and obtain the information identifying the UE device in the connections DB based on the identified connection. The network exposure device may then determine whether a user associated with the UE device has authorized sharing the information identifying the UE device with the application server. If the user, or another privacy consent entity associated with the user, has authorized sharing the information, the network exposure device may respond to the request and provide the requested information.

Furthermore, the API provided by the network exposure device may enable the application server to subscribe/request to be notified whenever the UE IP address and/or port assigned to the UE device has changed and been detected by the network exposure device via another subscriber ID message associated with the UE device being received. For example, the gateway device may send an updated subscriber ID message if the gateway device changes an IP address and/or port allocated to the UE device. If the network exposure device receives such a request and receives another subscriber ID message associated with the UE device, the network exposure device may provide updated identifying information associated with the UE device to the application server based on the received other subscriber ID message.

In other implementations, the UE device identify may be provided to an application server directly, without the involvement of a network exposure device, such as an SCEF/NEF device. For example, a gateway device, such as a PGW or UPF may expose an API that enables the application server to request identifying information for UE device. For example, the application server may use the API to request identity information for a UE device associated with an IP address and/or port detected by the application server based on data traffic flow associated with the UE device. The PGW or UPF may respond to the API request by providing an MSISDN, IMSI, RAT type, and/or other identifying information for the UE device associated with the IP address and/or port.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), radio access network (RAN) 130 that includes base stations 120-A to 120-M (referred to herein collectively as "base stations 120" and individually as "base station 120"), MEC network(s) 140 that include MEC device(s) 145, core network 150, packet data networks (PDNs) 160-A to 160-Y (referred to herein collectively as "PDNs 160" and individually as "PDN 160"), and an application server 170.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as Machine Type Communication (MTC), and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

Base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.).

RAN 130 may include base stations 120 and be managed by a provider of wireless communication services. RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 140 may be associated with one or more base stations 120 and may provide MEC services for UE devices 110 attached to the one or more base stations 120. MEC network 140 may be in proximity to the one or more base stations 120 from a geographic and network topology perspective, thus enabling low latency communication with UE devices 110 and/or base stations 120. As an example, MEC network 140 may be located on a same site as one of the one or more base stations 120. As another example, MEC network 140 may be geographically closer to the one or more base stations 120, and reachable via fewer network hops and/or fewer switches, than other base stations 120 and/or packet data networks 160. As yet another example, MEC network 140 may be reached without having to go through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed virtualized network functions (VNFs), which use virtualization based on virtual machines, and/or cloud native functions (CNFs), which use virtualization based on containers, used to implement particular network slices. Thus, MEC devices 145 may form part of an infrastructure for hosting network slices. For example, an Low Latency Communication (LLC) infrastructure may enable VNFs and/or CNFs, which use virtualization based on containers, to be implemented in a first MEC network 140 that includes MEC devices 145 accessible via a PGW or UPF connection, while a Ultra (U)-LLC infrastructure may enable VNFs and/or CNFs to be implemented in a second MEC network 140 that includes MEC devices 145 accessible without having to establish a connection via a PGW or UPF, by enabling a direct connection from base station 120 to MEC device 145. In some implementations, MEC device 145 may include a local application server that may request identification information associated with UE device 110 from a network exposure device, such as an SCEF and/or NEF device.

Core network 150 may be managed by the provider of cellular wireless communication services and may manage communication sessions of subscribers connecting to core network 150 via RAN 130. For example, core network 150 may establish an Internet Protocol (IP) connection between UE devices 110 and PDN 160. Core network 150 may include a 4G core network. Exemplary components of a 4G core network are described below with reference to FIG. 2. Core network 150 may include a 5G core network. Exemplary components of a 5G core network are described below with reference to FIG. 3.

The components of core network 150 may be implemented as dedicated hardware components, VNFs, and/or CNFs, implemented on top of a common shared physical infrastructure using Software Defined Networking (SDN). For example, an SDN controller may implement one or more of the components of core network 150 using an adapter implementing a VNF virtual machine, a CNF container, an event driven serverless architecture interface, and/or another type of SDN architecture. The common shared physical infrastructure may be implemented using one or more devices 400 described below with reference to FIG. 4 in a cloud computing center associated with core network 150. Additionally, or alternatively, some, or all, of the common shared physical infrastructure may be implemented using one or more devices 400 included in MEC device 145.

PDNs 160-A to 160-Y may each include a packet data network. A particular PDN 160 may be associated with an Access Point Name (APN) and UE device 110 may request a connection to the particular packet data network 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Application server 170 may include a computer device that hosts an application used by UE device 110 and/or provides another type of service to UE device 110. For example, application server 170 may host video and/or audio content and may stream video and/or audio to UE device 110, may host a game played by the user of UE device 110, may provide cloud computing services to UE device 110, may host a social media or another type of website, and/or may host another type of application and/or provide another type of service. Application server 170 may request identification information associated with UE device 110 from a network exposure device, such as an SCEF and/or NEF device.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
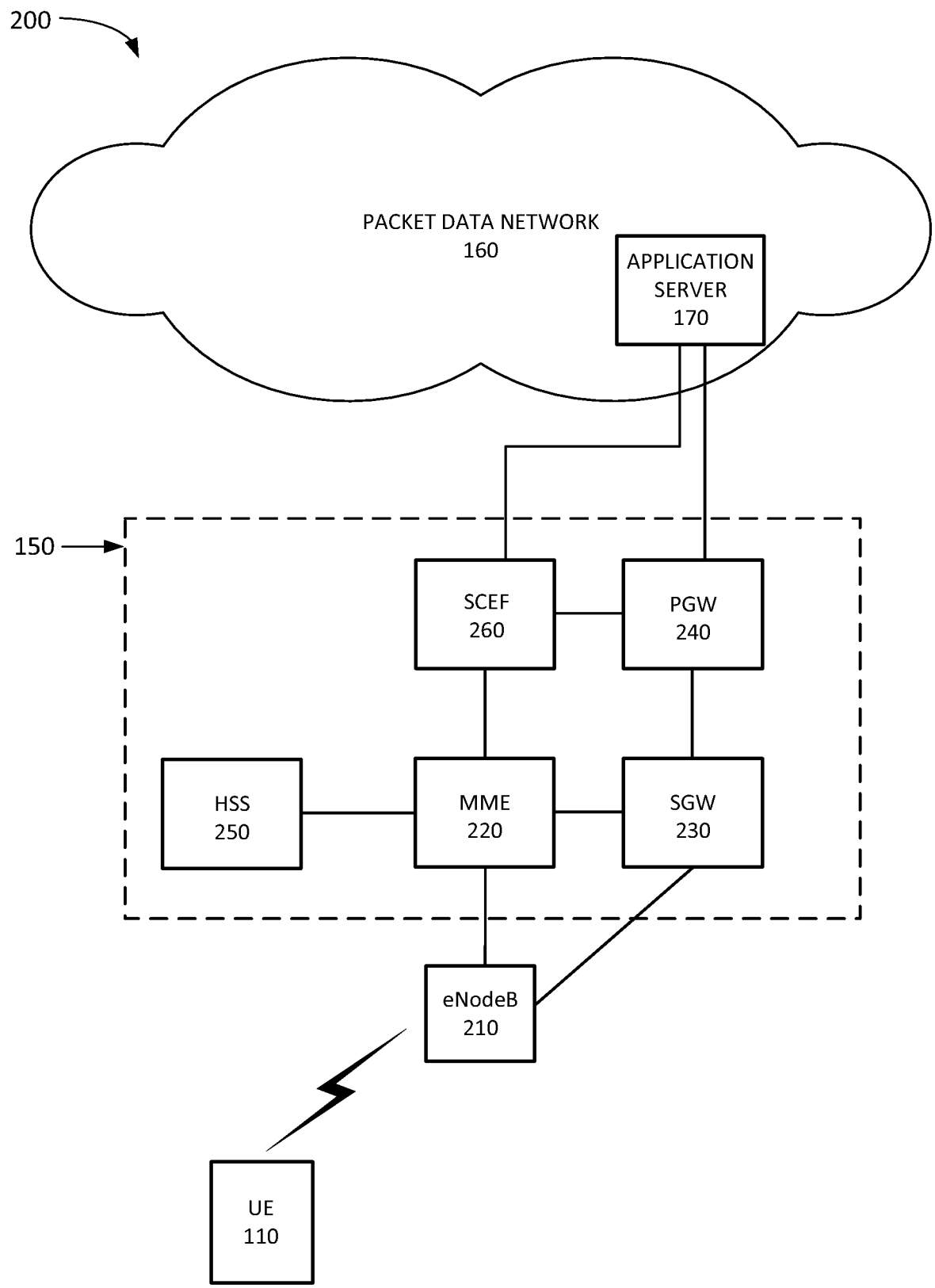
FIG. 2 illustrates exemplary components of the core network of FIG. 1 according to an implementation described herein.

FIG. 2 is a diagram illustrating an implementation 200 of core network 150 as a 4G core network. As shown in FIG. 2, implementation 200 includes UE device 110, eNodeB 210, core network 150, and packet data network 160. Core network 150 may include eNodeB 210 (corresponding to base station 120), a mobility management entity (MME) 220, a serving gateway (SGW) 230, a PGW 240, a home subscriber server (HSS) 250, and an SCEF 260. While FIG. 2 depicts a single eNodeB 210, MME 220, SGW 230, PGW 240, HSS 250, and SCEF 260 for illustration purposes, in practice, FIG. 2 may include multiple eNodeBs 210, MMES 220, SGWs 230, PGWs 240, HSS 250, and SCEFs 260.

eNodeB 210 may correspond to base station 120. eNodeB 210 may interface with core network 150 via an interface referred to as an S1 interface, which may be split into a control plane S1-MME interface and a data plane S1-U interface. S1-MME interface may interface with MME 220 and be implemented, for example, with a protocol stack that includes a Network Access Server (NAS) protocol and/or Stream Control Transmission Protocol (SCTP). An S1-U interface may interface with SGW 230 and may be implemented, for example, using General Tunneling Protocol version 2 (GTPv2).

MME 220 may implement control plane processing for core network 150. For example, MME 220 may implement tracking and paging procedures for UE device 110, may activate and deactivate bearers for UE device 110, may authenticate a user of UE device 110, and may interface to other radio access networks. A bearer may represent a logical channel with particular quality of service (QoS) requirements. MME 220 may also select a particular SGW 230 for a particular UE device 110. A particular MME 220 may interface with other MMES 220 in core network 150 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface that is implemented, for example, using GTPv2.

PGW 240 may function as a gateway to provider network 240 through an SGi interface. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 220 may communicate with SGW 230 through an S11 interface that is implemented, for example, using GTPv2. The S11 interface may be used to create and manage a new session for a particular UE device 110 and activated when MME 220 needs to communicate with SGW 230, such as when the particular UE device 110 attaches to core network 150, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to core network 150). MME 220 may communicate with HSS 250 through an S6a interface that is implemented, for example, using a Diameter protocol.

SCEF 260 may expose the services and/or capabilities of core network 150 and/or RAN 130 to application server 170. For example, application server 170 may use an API to request information relating to UE device 110 and/or to provide information relating to UE device 110 with respect to a particular service or capability. In particular, application server 170 may request information identifying UE device 110 from SCEF 260 using an API.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150.

Figure 3:
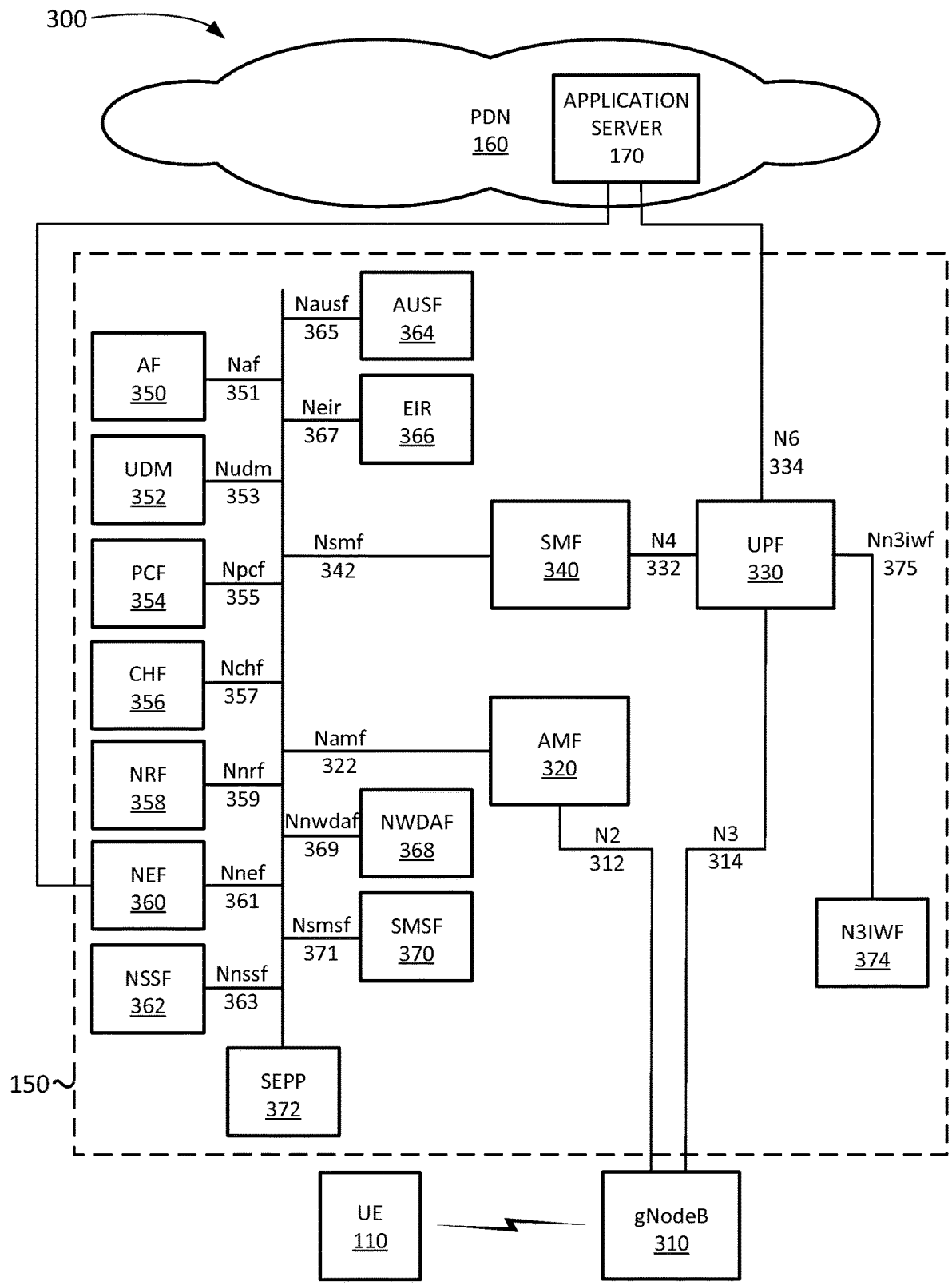
FIG. 3 illustrates exemplary components of the core network of FIG. 1 according to another implementation described herein.

FIG. 3 illustrates an implementation 300 of core network 150 as a 5G core network. As shown in FIG. 3, implementation 300 includes UE device 110, gNodeB 310, core network 150, and packet data network 160. Core network 150 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Charging Function (CHF) 356, a Network Repository Function (NRF) 358, a Network Exposure Function (NEF) 360, a Network Slice Selection Function (NSSF) 362, an Authentication Server Function (AUSF) 364, a 5G Equipment Identity Register (EIR) 366, a Network Data Analytics Function (NWDAF) 368, a Short Message Service Function (SMSF) 370, a Security Edge Protection Proxy (SEPP) 372, and a Non-3GPP Inter-Working Function (N3IWF) 374.

While FIG. 3 depicts a single AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, and N3IWF 374 for illustration purposes, in practice, core network 301 may include multiple AMFs 320, UPFs 330, SMFs 340, AFs 350, UDMs 352, PCFs 354, CHFs 356, NRFs 358, NEFs 360, NSSFs 362, AUSFs 364, EIRs 366, NWDAFs 368, SMSFs 370, SEPPs 372, and/or N3IWFs 374. gNodeB 310 may be part of RAN 120 and may include base station 125. Exemplary components of gNodeB 310 are describe below with reference to FIG. 3.

AMF 320 may perform registration management, connection management, reachability management, mobility management, lawful intercepts, Short Message Service (SMS) transport between UE device 110 and SMSF 370, session management messages transport between UE device 110 and SMF 340, access authentication and authorization, location services management, functionality to support non-3GPP access networks, and/or other types of management processes. AMF 320 may be accessible by other function nodes via an Namf interface 322.

UPF 330 may maintain an anchor point for intra/inter-RAT mobility, maintain an external Packet Data Unit (PDU) point of interconnect to a particular packet data network 160, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 310), and/or perform other types of user plane processes. UPF 330 may communicate with SMF 340 using an N4 interface 332 and connect to packet data network 160 using an N6 interface 334.

SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward PCF 354, perform lawful intercepts, charge data collection, support charging interfaces, control and coordinate of charging data collection, terminate session management parts of Non-Access Stratum messages, perform downlink data notification, manage roaming functionality, and/or perform other types of control plane processes for managing user plane data. SMF 340 may be accessible via an Nsmf interface 342.

AF 350 may provide services associated with a particular application, such as, for example, an application for influencing traffic routing, an application for accessing NEF 360, an application for interacting with a policy framework for policy control, and/or other types of applications. AF 350 may be accessible via an Naf interface 351, also referred to as an NG5 interface.

UDM 352 may maintain subscription information for UE devices 110, manage subscriptions, generate authentication credentials, handle user identification, perform access authorization based on subscription data, maintain service and/or session continuity by maintaining assignment of SMF 340 for ongoing sessions, support SMS delivery, support lawful intercept functionality, and/or perform other processes associated with managing user data. UDM 352 may store, in a subscription profile associated with a particular UE device 110, a list of network slices which the particular UE device 110 is allowed to access. UDM 352 may be accessible via a Nudm interface 353.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 355. CHF 356 may perform charging and/or billing functions for core network 150. CHF 356 may be accessible via Nchf interface 357.

NRF 358 may support a service discovery function and maintain profiles of available network function (NF) instances and their supported services. An NF profile may include an NF instance ID, an NF type, a Public Land Mobile Network (PLMN) ID(s) associated with the NF, network slice IDs associated with the NF, capacity information for the NF, service authorization information for the NF, supported services associated with the NF, endpoint information for each supported service associated with the NF, and/or other types of NF information. NRF 358 may be accessible via an Nnrf interface 359.

NEF 360 may expose services, capabilities, and/or events to other NFs, including third party NFs, AFs, edge computing NFs, and/or other types of NFs. Furthermore, NEF 360 may secure provisioning of information from external applications to core network 150, translate information between core network 150 and devices/networks external to core network 150, support a Packet Flow Description (PFD) function, and/or perform other types of network exposure functions. For example, application server 170 may use an API to request information identifying UE device 110 from NEF 360 using an API.

NSSF 362 may select a set of network slice instances to serve a particular UE device 110, determine network slice selection assistance information (NSSAI), determine a particular AMF 320 to serve a particular UE device 110, and/or perform other types of processing associated with network slice selection or management. NSSF 362 may provide a list of allowed slices for a particular UE device 110 to UDM 352 to store in a subscription profile associated with the particular UE device 110. NSSF 362 may be accessible via Nnssf interface 363.

AUSF 364 may perform authentication. For example, AUSF 364 may implement an Extensible Authentication Protocol (EAP) authentication server and may store authentication keys for UE devices 110. AUSF 364 may be accessible via Nausf interface 365. EIR 366 may authenticate a particular UE device 110 based on UE device identity, such as a Permanent Equipment Identifier (PEI). For example, EIR 366 may check to determine if a PEI has been blacklisted. EIR 366 may be accessible via Neir interface 367. NWDAF 368 may collect analytics information associated with radio access network 130 and/or core network 150. SMSF 370 may perform SMS services for UE devices 110. SMSF 370 may be accessible via Nsmsf interface 371. SEPP 372 may implement application layer security for all layer information exchanged between two NFs across two different Public Land Mobile Networks. N3IWF 374 may interconnect to a non-3GPP access device, such as, for example, a WiFi access point (not shown in FIG. 3). N3IWF 374 may facilitate handovers for UE device 110 between radio access network 130 and the non-3GPP access device. N3IWF 374 maybe accessible via Nn3iwf interface 375.

Although FIG. 3 shows exemplary components of core network 150, in other implementations, core network 150 may include fewer components, different components, differently arranged components, or additional components than depicted in FIG. 3. Additionally, or alternatively, one or more components of core network 150 may perform functions described as being performed by one or more other components of core network 150. For example, core network 150 may include additional function nodes not shown in FIG. 3, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 3, additionally, or alternatively, core network 150 may include a reference point architecture that includes point-to-point interfaces between particular function nodes.

Figure 4:
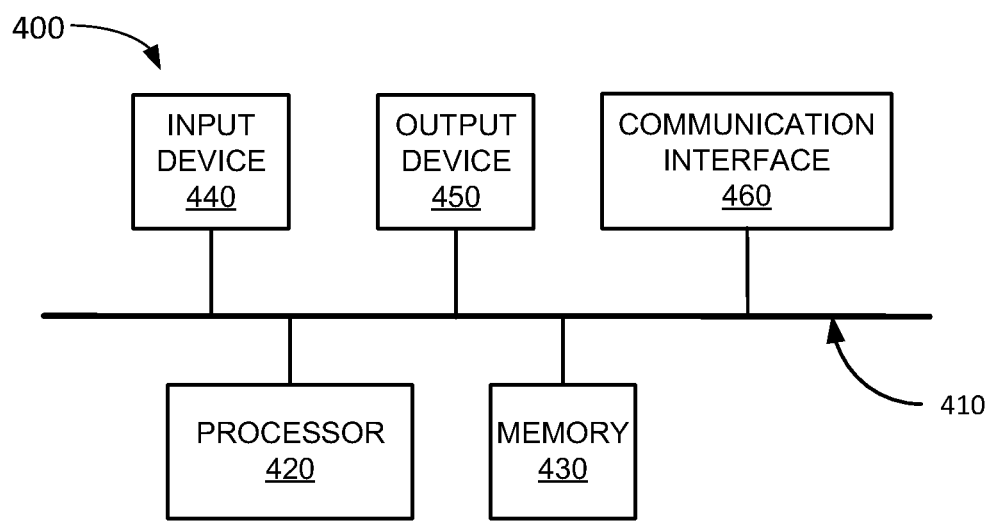
FIG. 4 illustrates exemplary components of a device that may be included in the components of FIG. 1, 2, or 4 according to an implementation described herein.

FIG. 4 is a diagram illustrating example components of a device 400 according to an implementation described herein. Each of the components of FIGS. 1, 2, and/or 3 may include, or be implemented on, one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some implementations, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the user. In some implementations, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to exposure-function-based user equipment identity. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
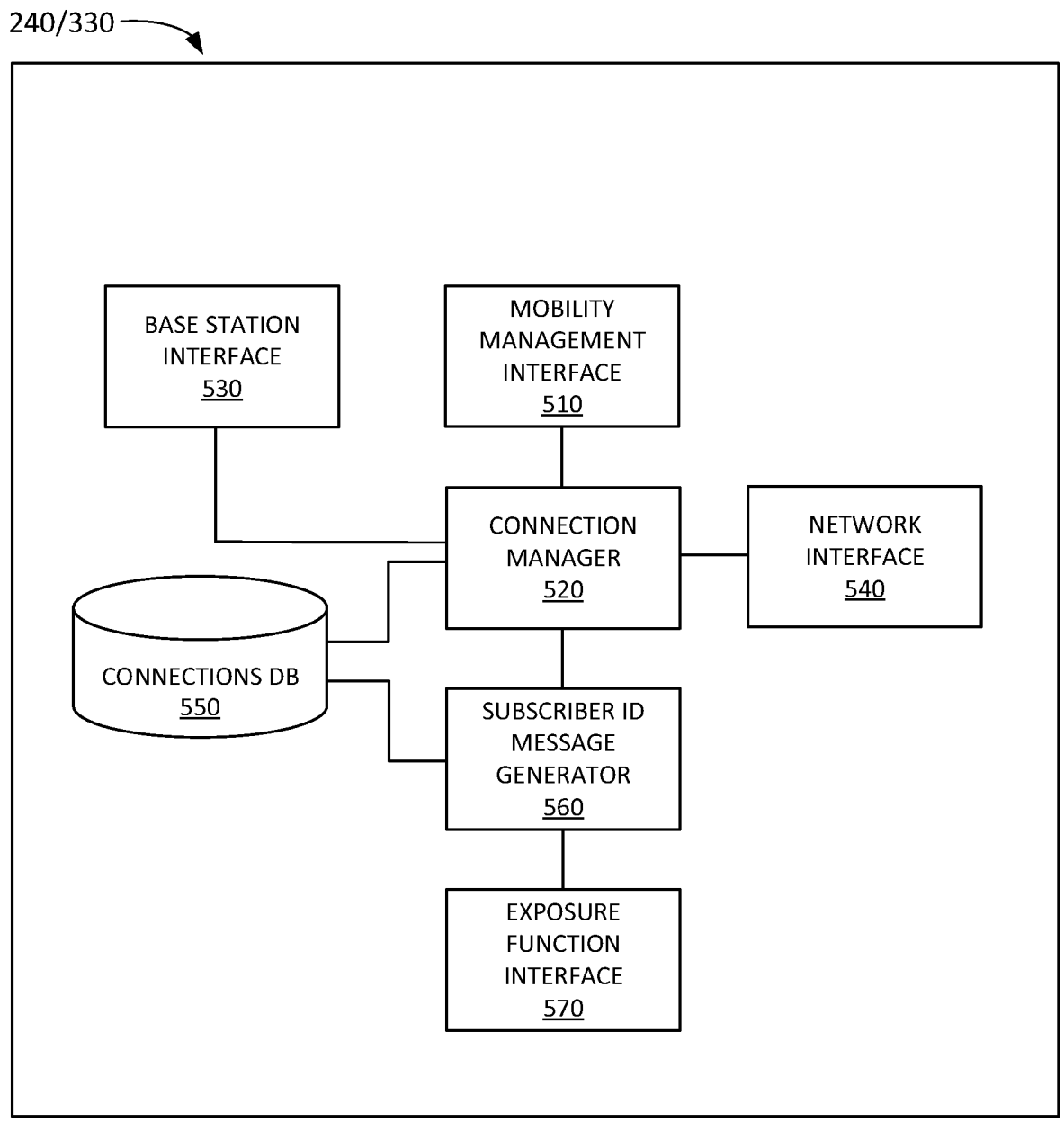
FIG. 5 illustrates exemplary components of the packet data network gateway of FIG. 2 or the user plane function of FIG. 3 according to an implementation described herein.

FIG. 5 is a diagram illustrating exemplary components of PGW 240 or UPF 330. The components of PGW 240 or UPF 330 may be implemented, for example, via processor 420 executing instructions from memory 430. Alternatively, some or all of the components of PGW 240 or UPF 330 may be implemented via hard-wired circuitry. As shown in FIG. 5, PGW 240 or UPF 330 may include a mobility management interface 510, a connection manager 520, a base station interface 530, a network interface 540, a connections DB 550, a subscriber ID message generator 560, and an exposure function interface 570.

Mobility management interface 510 may be configured to communicate with a mobility management device in core network 150, such as MME 220 or AMF 320. For example, mobility management interface 510 may receive an instruction from MME 220 or AMF 320 to set up a connection for UE device 110.

Connection manager 520 may manage connections associated with UE devices 110. For example, connection manager 520 may allocate an IP address and/or port to UE device 110 when UE device 110 attaches to core network 150 and may establish a connection between base station 120 serving UE device 110 and a network, such as packet data network 160 and/or MEC network 140. Base station interface 530 may be configured to communicate with base station 120, such as eNodeB 210 and/or gNodeB 310, that is serving UE device 110. Network interface 540 may be configured to communicate with a network with which UE device 110 is to communicate, such as packet data network 160 and/or MEC network 140.

Connections DB 550 may store information relating to UE device 110 connections managed by connection manager 520. For example, connections DB 550 may store, for a particular UE device 110, information identifying UE device 110 (e.g., MSISDN, IMSI, etc.), an allocated IP address and/or port for UE device 110, a RAT type associated with UE device 110, a network ID and/or APN with which UE device 110 is enabled to communicate, and/or other types of information associated with UE device 110.

Subscriber ID message generator 560 may generate a subscriber ID message, which includes information identifying UE device 110, when a connection for UE device 110 is established and send the subscriber ID message to a network exposure device, such as SCEF 260 or NEF 360 via exposure function interface 570. Exposure function interface 570 may be configured with SCEF 260 and/or NEF 360.

Although FIG. 5 shows exemplary components of PGW 240 or UPF 330, in other implementations, PGW 240 or UPF 330 may include fewer components, different components, additional components, or differently arranged components than depicted in FIG. 5. Additionally, or alternatively, one or more components of PGW 240 or UPF 330 may perform one or more tasks described as being performed by one or more other components of PGW 240 or UPF 330.

Figure 6:
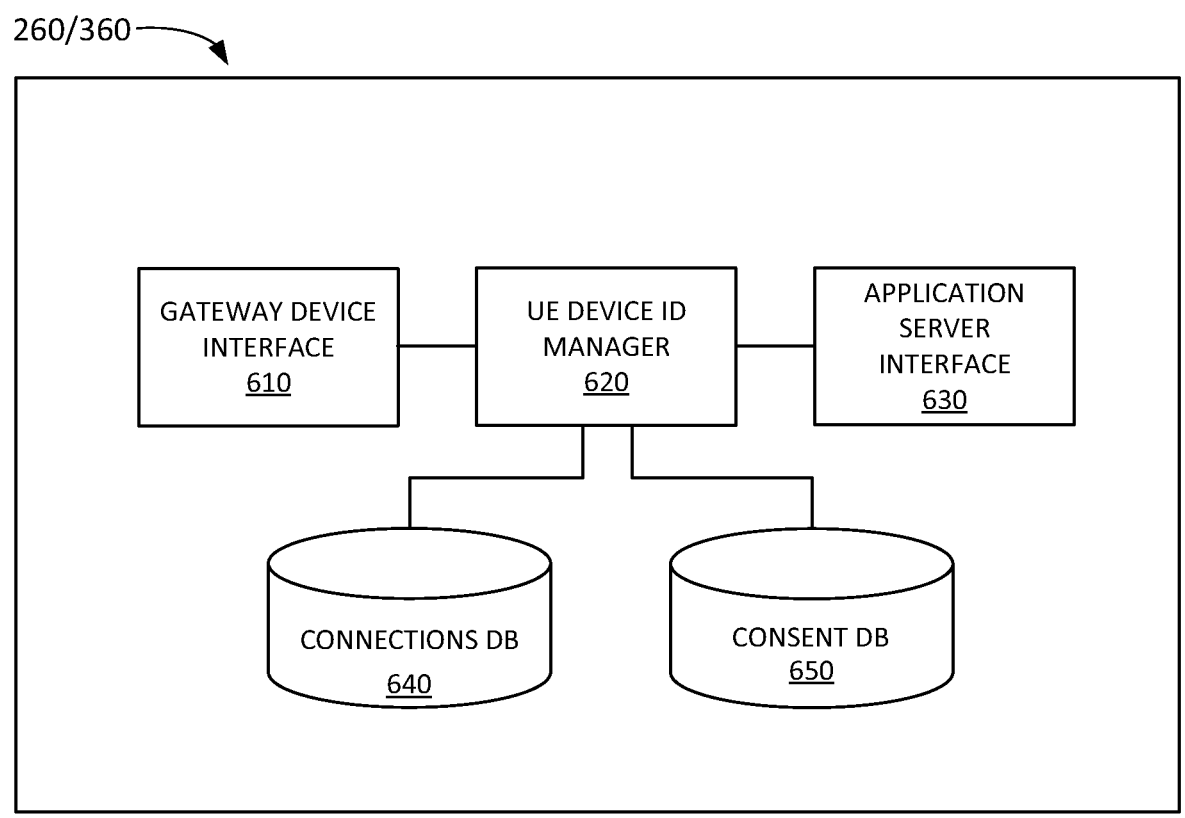
FIG. 6 illustrates exemplary components of the services and capabilities exposure function of FIG. 2 or the network exposure function of FIG. 3 according to an implementation described herein.

FIG. 6 is a diagram illustrating exemplary components of SCEF 260 or NEF 360. The components of SCEF 260 or NEF 360 may be implemented, for example, via processor 420 executing instructions from memory 430. Alternatively, some or all of the components of SCEF 260 or NEF 360 may be implemented via hard-wired circuitry. As shown in FIG. 6, SCEF 260 or NEF 360 may include a gateway device interface 610, a UE device ID manager 620, an application server interface 630, a connections DB 640, and a consent DB 650.

Gateway device interface 610 may be configured to communicate with a gateway device, such as PGW 240 or UPF 330. For example, gateway device interface 610 may be configured to receive subscriber ID messages from PGW 240 and/or UPF 330 and store information from the subscriber ID messages in connections DB 640. UE device ID manager 620 may manage requests for identifying information associated with UE device 110. UE device ID manager 620 may respond to requests from application server 170 by identifying UE device 110 associated with an IP address included in a request based on information stored in connections DB 640, determine whether a user associated with UE device 110 has consented to provide identifying information to application server 170 based on information stored in consent DB 650, and provide the identifying information to application server 170 via application server interface 630.

Application server interface 630 may be configured to communicate with application server 170. For example, application server interface 630 may provide an API that application server 170 may use to request identifying information associated with UE device 110, to request to be notified when the identifying information associated with the UE device 110 changes, and/or to receive responses to the requests via the API. Connections DB 640 may store information relating to UE devices 110 received via subscriber ID messages. Exemplary information that may be included in a subscriber ID message and thus stored in connections DB 640 is described below with reference to FIG. 7. Consent DB 650 may store information identifying whether a user associated with UE device 110 has consented to provide identifying information to application server 170. Consent may be received from UE device 110 via an application associated with the provider that manages core network 150, via an application associated with application server 170, and/or using another type of application or process associated with UE device 110.

Although FIG. 6 shows exemplary components of SCEF 260 or NEF 360, in other implementations, SCEF 260 or NEF 360 may include fewer components, different components, additional components, or differently arranged components than depicted in FIG. 6. Additionally, or alternatively, one or more components of SCEF 260 or NEF 360 may perform one or more tasks described as being performed by one or more other components of SCEF 260 or NEF 360.

Figure 7:
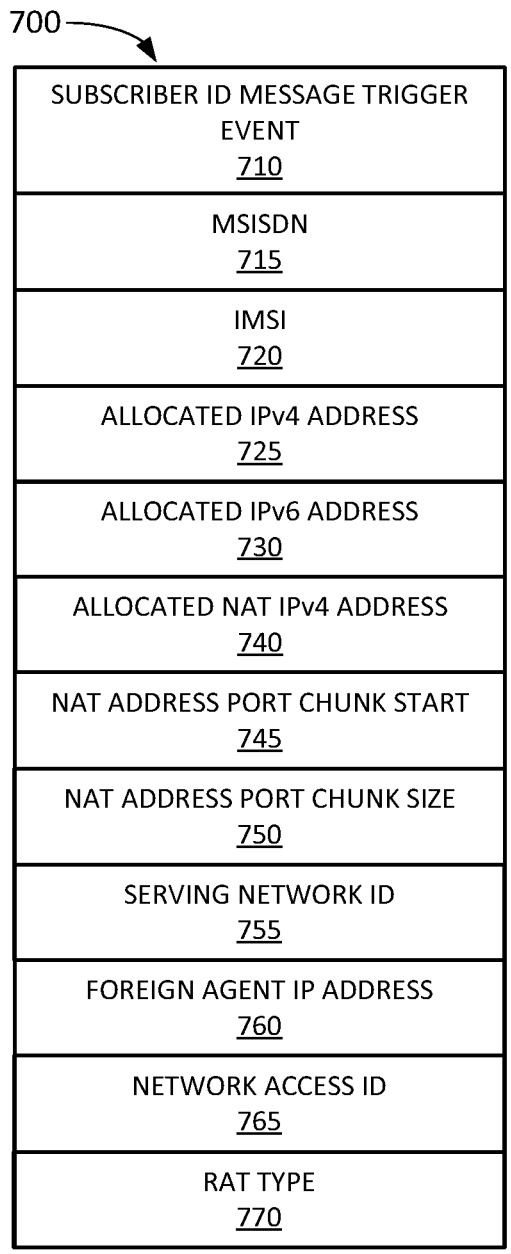
FIG. 7 illustrates exemplary components of a subscriber identifier message according to an implementation described herein.

FIG. 7 illustrates exemplary components of a subscriber ID message 700 according to an implementation described herein. As shown in FIG. 7, subscriber ID message 700 may include a subscriber ID message trigger event field 710, an MSISDN field 715, an IMSI field 720, an allocated IPv4 address field 725, an allocated IPv6 address field 730, an allocated NAT IPv4 address field 740, an allocated NAT port chunk start field 745, an allocated port chunk size field 750, a serving network ID field 755, a foreign agent IP address field 760, a network access ID field 765, and a RAT type field 770.

Subscriber ID message trigger event field 710 may store information identifying a trigger event that caused a subscriber ID message to be generated. The trigger event may include UE device 110 attaching to core network 150 via RAN 130, UE device 110 detaching from core network 150, an IP address and/or port being allocated to UE device 110, an IP address and/or port being deallocated to UE device 110, and/or another type of trigger event. MSISDN field 715 may store an MSISDN associated with UE device 110. IMSI field 720 may store an IMSI associated with UE device 110.

Allocated IPv4 address field 725 may store an IPv4 address allocated to UE device 110 by PGW 240 or UPF 330. Allocated IPv6 address field 730 may store an IPv6 address allocated to UE device 110 by PGW 240 or UPF 330. Allocated NAT IPv4 address field 740 may store a NAT IPv4 address allocated to UE device 110 by PGW 240 or UPF 330. PGW 240 or UPF 330 may perform NAT to convert a first IP address used by packet data network 160 and/or MEC network 140 to a second IP address used by core network 150 and/or RAN 130. Allocated NAT port chunk start field 745 may store information identifying a starting address for a port chunk allocated to UE device 110 by PGW 240 or UPF 330. Allocated port chunk size field 750 may store information identifying a port chunk size allocated to UE device 110 by PGW 240 or UPF 330.

Serving network ID field 755 may include a serving network ID associated with UE device 110. The serving network ID may correspond to an ID assigned to RAN 130 and/or core network 150. Foreign agent IP address field 760 may store a foreign agent IP address associated with UE device 110. A foreign agent IP address may be associated with UE device 110 if UE device 110 is associated with a different provider and is visiting RAN 130 and/or core network 150. Network access ID field 765 may store a network access ID associated with UE device 110. A network access ID may be used to authenticate UE device 110 when UE device 110 requests to attach to core network 150 via RAN 130. RAT type field 770 may sore information identifying a RAT type associated with UE device 110, such as whether UE device 110 has attached using a 4G LTE air interface, a 5G NR air interface, and/or a different RAT type.

Figure 8:
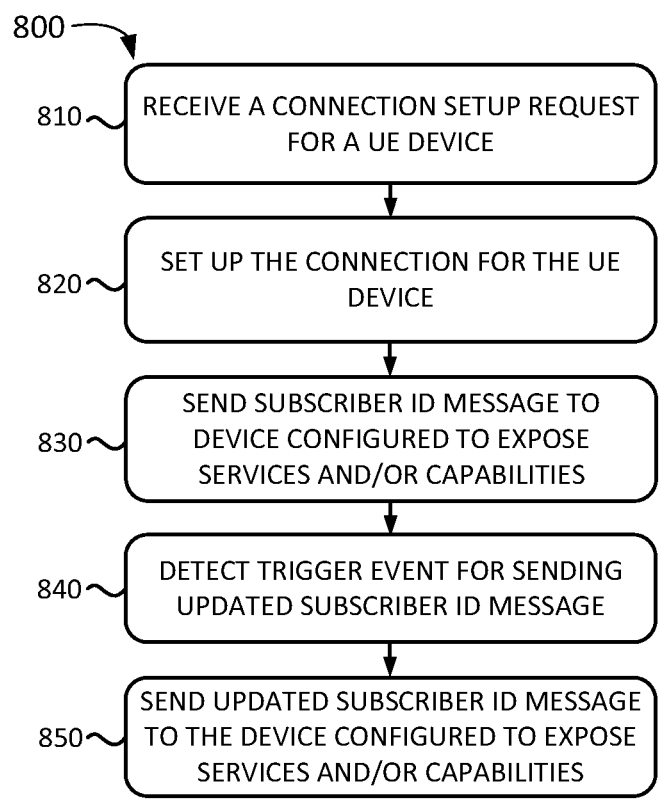
FIG. 8 illustrates a flowchart of a process for sending a subscriber identifier message according to an implementation described herein.

FIG. 8 illustrates a flowchart of a process for sending a subscriber ID message according to an implementation described herein. In some implementations, process 800 of FIG. 8 may be performed by PGW 240 or UPF 330. In other implementations, some or all of process 800 may be performed by another device or a group of devices separate from PGW 240 or UPF 330.

As shown in FIG. 8, process 800 may include receiving a connection setup request for a UE device (block 810) and setting up the connection for the UE device (block 820). For example, UE device 110 may request to attach to core network 150 via base station 120 and base station 120 may forward the request to a mobility management device, such as MME 220 or AMF 320. If core network 150 includes a 4G core network, MME 220 may instruct SGW 230 and PGW 240 to set up a connection between UE device 110 and a network (e.g., packet data network 170, MEC network 140, etc.). If core network 150 includes a 5G core network, AMF 320 may instruct SMF 340 to set up a connection between UE device 110 and the network using UPF 330. PGW 240 or UPF 330 may allocate an IP address and/or a port to UE device 110 from an IP address pool.

A subscriber ID message may be sent to a device configured to expose services and/or capabilities (block 830). For example, in response to establishing the connection, PGW 240 or UPF 330 may send subscriber ID message 700 to a network exposure device, such as SCEF 260 (for PGW 240), NEF 360 for UPF 330, or a combined SCEF/NEF device in core network 150. As explained above with reference to FIG. 7, subscriber ID message 700 may include an IP address allocated to UE device 110 and information identifying UE device 110, such as an MSISDN associated with UE device 110, an IMSI associated with UE device 110, and/or other types of identifying information associated with UE device 110.

A trigger event may be detected for sending an updated subscriber ID message (block 840) and the updated subscriber ID message may be sent to the device configured to expose services and/or capabilities (block 850). For example, PGW 240 or UPF 330 may detect a trigger event for sending another subscriber ID message to the network exposure device, such as UE device 110 detaching from core network 150, UE device re-attaching to core network 150, an IP address and/or port being deallocated to UE device 110, a different IP address and/or port being allocated to UE device 110, and/or another type of trigger event. In response to detecting the trigger event, PGW 240 or UPF 330 may send another subscriber ID message to the network exposure device with updated information, such as, for example, an updated IP address and/or port allocated to UE device 110.

Figure 9:
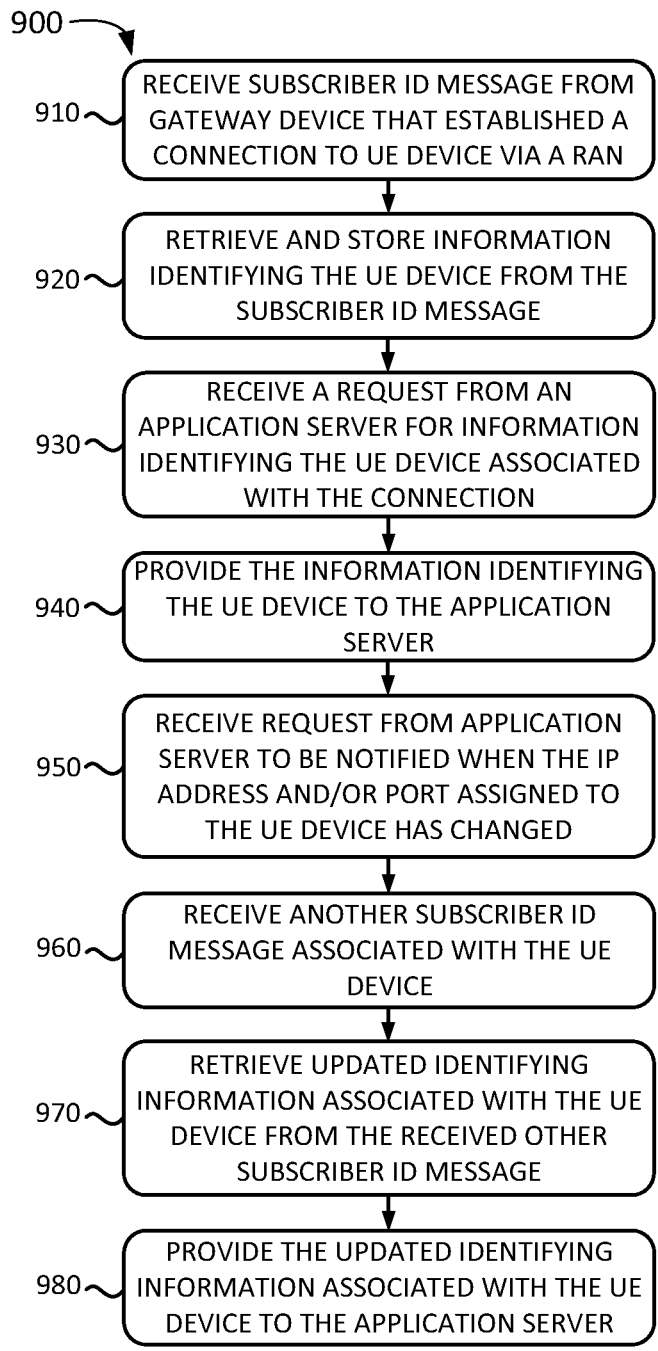
FIG. 9 illustrates a flowchart of a process for providing information identifying a user equipment device to an application server according to an implementation described herein.

FIG. 9 illustrates a flowchart of a process for providing information identifying a user equipment device to an application server according to an implementation described herein. In some implementations, process 900 of FIG. 9 may be performed by SCEF 260, NEF 360, or a device combined to function as both SCEF 260 and NEF 360. In other implementations, some or all of process 900 may be performed by another device or a group of devices separate from SCEF 260, NEF 360, or the device combined to function as both SCEF 260 and NEF 360.

As shown in FIG. 9, process 900 may include receiving a subscriber ID message from a gateway device that established a connection to a UE device via a RAN (block 910) and retrieving and storing information identifying the UE device from the subscriber ID message (block 920). For example, SCEF 260 or NEF 360 may receive subscriber ID message 700 and store information included in subscriber ID message 700 in connections DB 640.

A request may be received from an application server for information identifying the UE device associated with the connection (block 930) and the information identifying the UE device may be provided to the application server (block 940). For example, application server 170 may use an API associated with SCEF 260 or NEF 360 to request identifying information for UE device 110 associated with an IP address used by UE device 110 to connect to application server 170. SCEF 260 or NEF 360 may access connections DB 640 to identify a connection associated with the IP address and to identify UE device 110 associated with the connection. SCEF 260 or NEF 360 may then access consent DB 650 to determine whether a user associated with UE device 110 has given consent to share the identifying information with application server 170. If SCEF 260 or NEF 360 determines that the user has provided the consent, SCEF 260 or NEF 360 may respond to the request by providing the identifying information associated with UE device 110 stored in connections DB 640. The identifying information may include, for example, any of the information that was received in subscriber ID message 700, such as the MSISDN, IMSI, IP address information, port information, serving network ID, network access ID, RAT type, and/or other types of information received from PGW 240 or UPF 330 in subscriber ID message 700.

A request may be received from the application server to be notified when the UE IP address and/or port assigned to the UE device has changed (block 950). For example, application server 170 may subscribe or request, using the API, to be notified whenever the UE IP address and/or port assigned to the UE device has changed. SCEF 260 or NEF 360 may determine that the UE IP address and/or port assigned to the UE device has changed based on receiving an updated subscriber ID message 700 for UE device 110. The subscription/request for updates may be included in the original request or provided in a subsequent request in response to receiving the requested identifying information.

Another subscriber ID message associated with the UE device may be received (block 960), updated identifying information associated with the UE device may be retrieved from the received other subscriber ID message (block 970), and the updated identifying information associated with the UE device may be provided to the application server (block 980). For example, SCEF 260 or NEF 360 may receive an updated subscriber ID message 700 from PGW 240 or UPF 330 indicating that at least some of the information stored in connections DB 640 with respect to UE device 110 has changed. For example, PGW 240 or UPF 330 may change an IP address and/or port allocated to UE device 110, a RAT type associated with UE device 110 may change (e.g., a change from a 5G NR air interface connection to a 4G LTE air interface connection, etc.), etc. In response, SCEF 260 or NEF 360 may use the API to send an update notification to application server 170 with the updated information.

Figure 10:
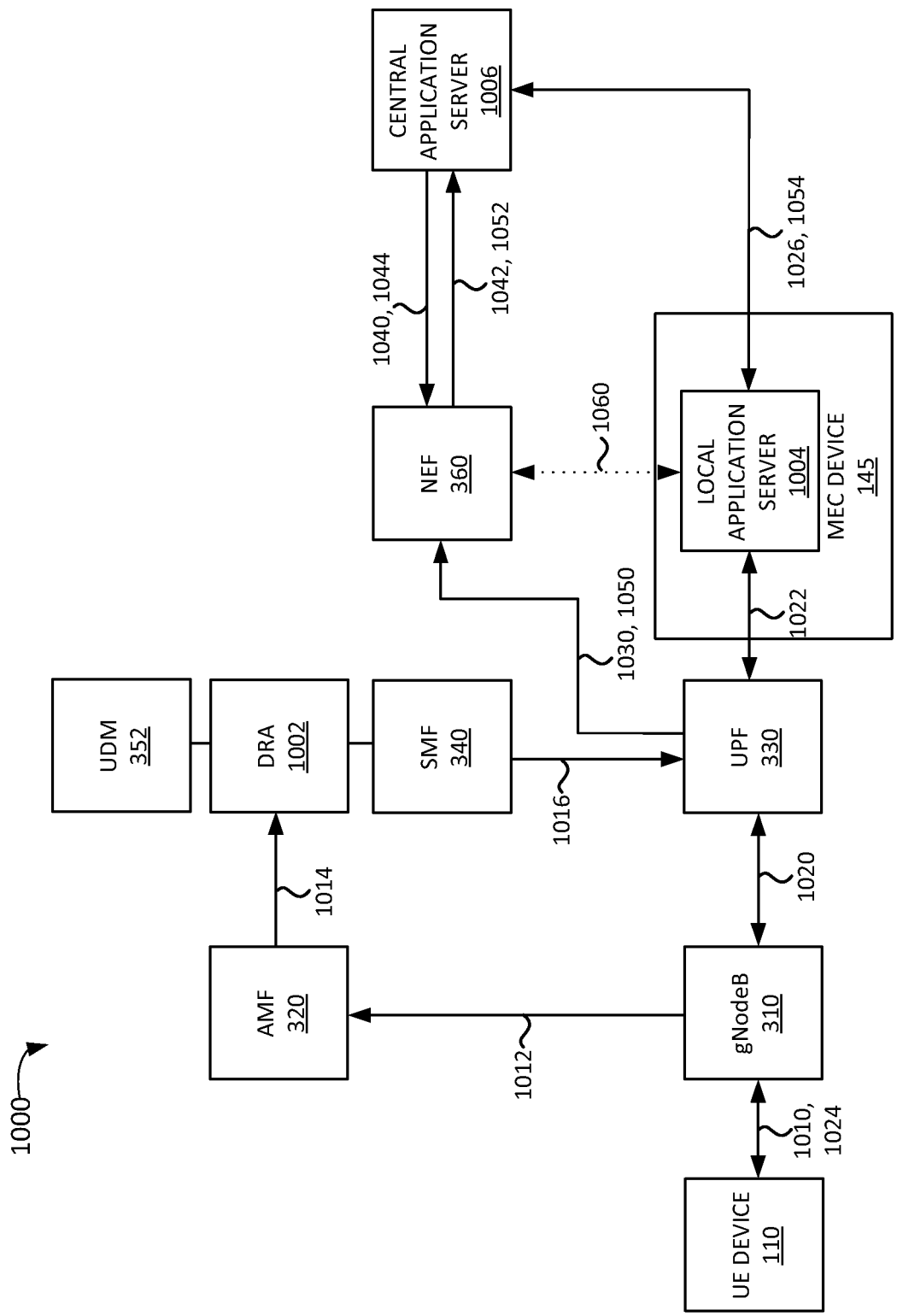
FIG. 10 illustrates an exemplary signal flow diagram according to an implementation described herein.

FIG. 10 illustrates an exemplary signal flow 1000 according to an implementation described herein. As shown in FIG. 10, signal flow 1000 may include UE device 110 requesting to attach to core network 150 and connect to local application server 1004 via gNodeB 310 (signal 1010) and gNodeB 310 forwarding the request to AMF 320 (signal 1012). AMF 320 may instruct SMF 340 to set up a connection to local application server 1004 via Diameter Routing Agent (DRA) 1002 (signal 1014). DRA 1002 may function as a routing device in core network 150. SMF 340 may instruct UPF 330 to set up a PDU connection between UE device 110 and local application server 1004 hosted on MEC device 145 (signal 1020). UPF 330 may allocate an IP address to UE device 110 from an IP address pool and may forward PDUs from UE device 110 to local application server 1004 using the allocated IP address as the source IP address and may forward PDUs from local application server 1004 with the allocated IP address as the destination address to UE device 110 (signals 1020, 1022, and 104).

Local application server 1004 may communicate with central application server 1006 to manage user sessions. For example, local application server 1004 may stream video content to UE device 110 from MEC device 145 and central application server 1006 may authenticate UE device 110 to determine whether UE device 110 is authorized to stream a request video item. Thus, local application server 1004 may request to authenticate the IP address associated with UE device 110 with central application server 1006 (signal 1026).

In response to establishing the connection, UPF 330 may send a subscriber ID message to NEF 360 (signal 1030). The subscriber ID message may include an IP address allocated to UE device 110 by UPF 330 and information identifying UE device 110, such as an MSISDN associated with UE device 110, an IMSI associated with UE device 110, and/or other types of identifying information associated with UE device 110.

Returning to central application server 1006, when central application server 1006 receives the IP address associated with UE device 110, central application server 1006 may use an API associated with NEF 360 to request identifying information associated with the IP address (signal 1040). NEF 360 may identify UE device 110 associated with the IP address based on information stored in connections DB 640.

NEF 360 may then determine whether a user associated with UE device 110 has authorized providing identifying information to central application server 1006 by checking consent DB 650. If the user has given consent to provide the identifying information, NEF 360 may respond by providing the MSISDN, IMSI, and/or other types of information (e.g., the RAT type associated with UE device 110, etc.) to central application server 1006 (signal 1006). Central application server 1006 may the authenticate UE device 110 using the received identifying information (signal 1054).

Additionally, central application server 1006 may request to be notified if updated information associated with UE device 110 is received by NEF 360 (signal 1044). At a later time, the IP address allocated to UE device 110 by UPF 330 may change. For example, UE device 110 may be reset, resulting in UE device 110 re-attaching to core network 150 and UPF 330 allocating a different IP address to UE device 110. In response, UPF 330 may send another subscriber ID message to NEF 360 with the updated IP address (signal 1050). NEF 360 may receive the updated subscriber ID message and send a notification to central application server 1006 with the updated IP address for UE device 110 (signal 1052).

In some implementations, local application server 1004 may communicate with NEF 360 directly without having to communicate with central application server 1006 (shown as the dotted line labeled as signal 1060). Thus, NEF 360 may provide an API to local application server 1004 on MEC device 145.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8 and 9, and a series of signals have been described with respect to FIG. 10, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a device in a core network associated with a radio access network (RAN), a subscriber identifier message from a gateway device that established a connection to a user equipment (UE) device via the RAN, wherein the subscriber identifier message includes a UE device identifier field storing information identifying the UE device, an Internet Protocol (IP) field storing information identifying an IP address allocated to the UE device by the gateway device, a Radio Access Technology (RAT) type field storing information identifying a RAT type used by the UE device to connect to the RAN, and a message trigger event field storing information identifying a trigger event that caused the subscriber identifier message to be sent, wherein the information identifying the RAT type indicates whether the UE device has attached to the RAN using a Long Term Evolution (LTE) air interface or a New Radio (NR) air interface, and wherein the device is configured to communicate with a server outside the core network;
storing, by the device, the information identifying the UE device in a database maintained by the device;
receiving, by the device, a request from the server associated with the connection for the information identifying the UE device, wherein the request from the server includes an Internet Protocol (IP) address;

identifying, by the device, the connection associated with the UE device in the database maintained by the device based on the IP address included in the request from the server;

obtaining the information identifying the UE device based on the identified connection in the database; and providing, by the device, the obtained information identifying the UE device to the server, based on receiving the request from the server.

2. The method of claim 1, wherein the subscriber identifier message further includes at least one of:
 a Mobile Station International Subscriber Directory Number (MSISDN) associated with the UE device;
 an International Mobile Subscriber Identity (IMSI) associated with the UE device;
 or
 a port allocated to the UE device by the gateway device.

3. The method of claim 1, wherein the trigger event includes at least one of:
 the UE device attaching to the core network via the RAN,
 the UE device detaching from the core network,
 an Internet Protocol (IP) address or port being allocated to the UE device, or
 an IP address or port being deallocated for the UE device.

4. The method of claim 1, wherein the gateway device implements a Packet Data Network Gateway (PGW) and wherein the device in the core network implements a Service Capabilities Exposure Function (SCEF) in the core network.

5. The method of claim 1, wherein the gateway device implements a User Plane Function (UPF) and wherein the device in the core network implements a Network Exposure Function (NEF) in the core network.

6. The method of claim 1, further comprising:
 determining that a user associated with the UE device has authorized sharing the information identifying the UE device with the server; and
 wherein the requested information identifying the UE device is provided to the server based on determining that the user associated with the UE device has authorized sharing the information identifying the UE device with the server.

7. The method of claim 1, further comprising:
 receiving another request from the server, wherein the other request indicates that the server is to be notified when an Internet Protocol (IP) address or a port assigned to the UE device changes;
 receiving another subscriber identifier message associated with the UE device; and
 providing updated identifying information associated with the UE device to the server based on the received other subscriber identifier message.

8. The method of claim 7, wherein the updated identifying information associated with the UE device indicates that an Internet Protocol (IP) address allocated to the UE device has changed.

9. A device comprising:
 a processor configured to:
  expose services or capabilities to application servers outside the core network, wherein the device is located in a core network associated with a radio access network (RAN);
  receive a subscriber identifier message from a gateway device that established a connection to a user equipment (UE) device via the RAN, wherein the subscriber identifier message includes a UE device identifier field storing information identifying the UE device, an Internet Protocol (IP) field storing information identifying an IP address allocated to the UE device by the gateway device, a Radio Access Technology (RAT) type field storing information identifying a RAT type used by the UE device to connect to the RAN, and a message trigger event field storing information identifying a trigger event that caused the subscriber identifier message to be sent, and wherein the information identifying the RAT type indicates whether the UE device has attached to the RAN using a Long Term Evolution (LTE) air interface or a New Radio (NR) air interface;
  store the information identifying the UE device in a database maintained by the device;
  receive a request from an application server associated with the connection for the information identifying the UE device, wherein the request from the server includes an Internet Protocol (IP) address;
  identify the connection associated with the UE device in the database maintained by the device based on the IP address included in the request from the server;
  obtain the information identifying the UE device based on the identified connection in the database; and
  provide the obtained information identifying the UE device to the application server, based on receiving the request from the application server.

10. The device of claim 9, wherein the subscriber identifier message further includes at least one of:
 a Mobile Station International Subscriber Directory Number (MSISDN) associated with the UE device;
 an International Mobile Subscriber Identity (IMSI) associated with the UE device;
 or
 a port allocated to the UE device by the gateway device.

11. The device of claim 9, wherein the trigger event includes at least one of:
 the UE device attaching to the core network via the RAN,
 the UE device detaching from the core network,
 an Internet Protocol (IP) address or port being allocated to the UE device, or
 an IP address or port being deallocated for the UE device.

12. The device of claim 9, wherein the gateway device implements a Packet Data Network Gateway (PGW) and wherein the device in the core network implements a Service Capabilities Exposure Function (SCEF) in the core network.

13. The device of claim 9, wherein the gateway device implements a User Plane Function (UPF) and wherein the device in the core network implements a Network Exposure Function (NEF) in the core network.

14. The device of claim 9, wherein the processor is further configured to:
 determine that a user associated with the UE device has authorized sharing the information identifying the UE device with the application server; and
 wherein the processor provides the requested information identifying the UE device to the application server based on determining that the user associated with the UE device has authorized sharing the information identifying the UE device with the application server.

15. The device of claim 9, wherein the processor is further configured to:
 receive another request from the application server, wherein the other request indicates that the application server is to be notified when another subscriber identifier message associated with the UE device is received by the device;

receive another subscriber identifier message associated with the UE device; and provide updated identifying information associated with the UE device to the application server based on the received other subscriber identifier message, wherein the updated identifying information associated with the UE device indicates that an Internet Protocol (IP) address allocated to the UE device has changed.

16. A system comprising:

a first device configured to:
  establish a connection to a user equipment (UE) device via a radio access network (RAN); and a second device configured to:
  expose services or capabilities to application servers outside a core network, wherein the device is located in the core network associated with the RAN;

wherein the first device is further configured to:
  send a subscriber identifier message to the second device in response to establish the connection to the UE device, wherein the subscriber identifier message includes a UE device identifier field storing information identifying the UE device, an Internet Protocol (IP) field storing information identifying an IP address allocated to the UE device by the gateway device, a Radio Access Technology (RAT) type field storing information identifying a RAT type used by the UE device to connect to the RAN, and a message trigger event field storing information identifying a trigger event that caused the subscriber identifier message to be sent, and wherein the information identifying the RAT type indicates whether the UE device has attached to the RAN using a Long Term Evolution (LTE) air interface or a New Radio (NR) air interface; and wherein the second device is further configured to:
  store the information identifying the UE device in a database maintained by the device;
  receive a request from an application server associated with the connection for the information identifying the UE device;
  identify the connection associated with the UE device in the database maintained by the device based on the IP address included in the request from the server;
  obtain the information identifying the UE device based on the identified connection in the database; and
  provide the obtained information identifying the UE device to the application server, based on receiving the request from the application server.

17. The system of claim 16, wherein the first device is further configured to:
  detect another trigger event for sending another subscriber identifier message, wherein the other trigger event includes at least one of:
    the UE device attaching to the core network via the RAN,
    the UE device detaching from the core network,
    allocating an Internet Protocol (IP) address or port for the UE device, or
    deallocated an IP address or port being for the UE device; and
  send the other subscriber identifier message to the second device, in response to detecting the other trigger event, wherein the other subscriber identifier message includes updated identifying information associated with the UE device.

18. The system of claim 16, wherein the subscriber identifier message includes at least one of:
  a Mobile Station International Subscriber Directory Number (MSISDN) associated with the UE device;
  an International Mobile Subscriber Identity (IMSI) associated with the UE device;
  or
  a port allocated to the UE device by the gateway device.

19. The system of claim 16, wherein the first device includes a Packet Data Network Gateway (PGW) and the second device includes a Service Capabilities Exposure Function (SCEF), or wherein the first device includes a User Plane Function (UPF) and the second device includes a Network Exposure Function (NEF).

20. The system of claim 16, wherein the trigger event includes at least one of:
  the UE device attaching to the core network via the RAN,
  the UE device detaching from the core network,
  an Internet Protocol (IP) address or port being allocated to the UE device, or
  an IP address or port being deallocated for the UE device.

* * * * *